(12) United States Patent
Boetto (10) Patent No.: US 7,188,804 B1
(45) Date of Patent: Mar. 13, 2007

(54) FLOAT RETRACTABLE LANDING GEAR

(76) Inventor: Steven C. Boetto, 233 E. SR 434, Longwood, FL (US) 32750

(*) Notice: Subject to any disclaimer, the term of this patent is extended or adjusted under 35 U.S.C. 154(b) by 184 days.

(21) Appl. No.: 10/876,042

(22) Filed: Jun. 25, 2004

(51) Int. Cl.
B64C 25/54 (2006.01)

(52) U.S. Cl. ..................................... 244/101

(58) Field of Classification Search ............ 244/100 R, 244/101, 102 R, 102 A, 104 R, 105, 106, 244/107, 108, 102 SL, 102 SS, 12 R
See application file for complete search history.

(56) References Cited

U.S. PATENT DOCUMENTS

| | | | |
|---|---|---|---|
| 1,269,570 A | 6/1918 | Curtiss | |
| 1,386,310 A | 8/1921 | Bolas | |
| 1,517,546 A | 12/1924 | Dunham | |
| 1,552,259 A * | 9/1925 | Zimmermann et al. | 244/101 |
| 1,563,384 A * | 12/1925 | Loening | 244/101 |
| 1,597,305 A | 8/1926 | Zimmermann et al. | |
| 1,732,209 A * | 10/1929 | Aberg | 244/101 |
| 1,852,691 A | 4/1932 | Beilgard | |
| 1,859,624 A * | 5/1932 | Grumman | 244/102 R |
| 2,025,735 A * | 12/1935 | Flader | 244/101 |
| 2,051,021 A * | 8/1936 | Bellanca | 244/101 |
| 2,053,093 A * | 9/1936 | Luburg | 244/101 |
| 2,064,674 A * | 12/1936 | Luburg et al. | 244/105 |
| 2,064,675 A * | 12/1936 | Luburg | 244/101 |
| 2,096,535 A * | 10/1937 | Bellanca | 244/101 |
| 2,159,058 A * | 5/1939 | Taylor et al. | 244/101 |
| 2,190,358 A * | 2/1940 | Knut et al. | 244/101 |
| 2,196,946 A * | 4/1940 | Stone | 244/101 |
| 2,222,850 A * | 11/1940 | Finlay | 244/100 R |
| 2,405,651 A * | 8/1946 | Height | 244/102 R |
| 2,415,615 A * | 2/1947 | Wallace | 244/102 R |
| 2,454,081 A * | 11/1948 | Molloy et al. | 244/110 G |
| 2,755,041 A * | 7/1956 | Lewis | 244/102 R |
| 2,759,739 A * | 8/1956 | Walsh | 280/62 |
| 2,964,271 A * | 12/1960 | Strawn | 244/101 |
| 3,136,505 A * | 6/1964 | Fleury | 244/101 |
| 3,347,499 A | 10/1967 | Larkin | |
| 3,738,598 A * | 6/1973 | Larkin | 244/105 |
| 3,854,679 A * | 12/1974 | Smethers | 244/106 |
| 3,899,147 A * | 8/1975 | Masclet et al. | 244/102 R |
| 4,691,881 A * | 9/1987 | Gioia | 244/106 |
| 7,040,573 B2 * | 5/2006 | Selman | 244/101 |
| 2003/0164424 A1 * | 9/2003 | Smith et al. | 244/105 |
| 2005/0224641 A1 * | 10/2005 | Smith et al. | 244/105 |

* cited by examiner

Primary Examiner—Teri Pham Luu
Assistant Examiner—Stephen A. Holzen
(74) Attorney, Agent, or Firm—Paul S. Rooy, P.A.

(57) ABSTRACT

A float retractable landing gear. The float retractable landing gear incorporates a wheel support, a side gear door, a bottom gear door, and one or more hinges and strut ears attached to a spine. At least one hinge is rotatably attached to a float. The float incorporates a float side cutout communicating with a float bottom cutout. A spring-loaded strut incorporating on over center toggle down lock feature is attached between the float retractable landing gear and the float. A float side wall skin is attached to an upper portion of the float side wall cutout. The side gear door is sized to cover the lower portion of the float side wall cutout, and the bottom gear door is sized to cover the float bottom cutout. The float retractable landing gear may be specified to default into the extended or retracted position depending on the strut spring constant selected.

37 Claims, 8 Drawing Sheets

FLOAT RETRACTABLE LANDING GEAR

BACKGROUND OF THE INVENTION

1. Field of the Invention

This invention relates to retractable landing gear for aircraft, and in particular to a float retractable landing gear.

2. Background of the Invention

Before the Wright brothers made their famous "first flight" on Dec. 12, 1903, another aviator named Samuel P. Langley attempted two powered flights launched from a houseboat in his Langley Aerodrome. These attempts occurred on Oct. 7 and Dec. 8, 1903. Unfortunately, both ended in premature water landings in the Potomac River.

Sadly, Langley died in 1906 without again attempting flight. The Langley Aerodrome was consigned to storage, where it languished until 1914. During that year the Smithsonian Institute sponsored a study of its airworthiness. The Aerodrome was taken out of storage and shipped to the Curtiss factory at Hammonsport. Glenn Curtiss undertook its restoration, and made several modifications, including mounting it on floats.

During the morning of May 29, 1914 Curtiss flew the Aerodrome 150 feet, and landed softly on the water. This was accomplished despite the addition of 350 pounds of weight, caused by the floats and their supports. Thus, it could be argued that the first aircraft design capable of engaging in controlled, powered flight, was a seaplane!

Seaplanes acquired great utility in the years before World War II, when few land airports existed. Seaplanes, as opposed to land planes, could alight anywhere suitable smooth water existed. The large flying boats of the era plied the airways from Europe to Africa, around the Americas and across the Pacific to the Far East.

Seaplanes still enjoy popularity in areas lacking land airports, such as Canada and Alaska. In addition, the sheer joy of landing and taking off from water attracts innumerable aficionados, who fly a wide variety of seaplanes.

Seaplanes are classified as flying boats or floatplanes. Flying boats land on their bellies in the water, and typically incorporate small floats called sponsons on their wings for roll stability while on the water. Float planes, on the other hand, typically feature a pair of large, parallel sausage-shaped floats attached to their undersides by struts. Floatplanes are generally high-wing, and thus easier to dock than flying boats, because their wings don't interfere with the dock. The float plane design also provides the flexibility of being able to mount floats on existing land plane designs. This flexibility saves time and money, because an entirely new airplane need not be designed—merely a means of attaching floats to an existing design.

Floatplanes may be equipped with retractable wheels, or landing gear, so as to afford the added versatility of being able to land on water or on a land runway. This type of floatplane is called an amphibian. Amphibians truly have the best of all worlds: they can land on any suitable land runway, and in addition they can land on any suitable water surface. This versatility permits a float plane to take off from a city airport, and land at its owner's lake out in the country. Amphibious floatplanes are commonly used to provision lake-side hunting and fishing camps, remote villages, and to transport patients from remote locations to hospitals.

An amphibian pilot must always be certain to have the retractable landing gear in the correct position when landing. Student floatplane pilots are taught to recite the mantras: "This is a LAND landing—gear checked DOWN" and "This is a WATER landing—gear checked UP". Making a land landing with the retractable landing gear erroneously retracted generally doesn't seriously damage the floats (although the runway surface could scrape them up some), or injure the floatplane occupants.

Making a water landing with the gear erroneously extended, however, is a horse of a different color. Landing in the water with gear extended could destroy the aircraft and seriously injure or kill its occupants. The reason is that on initial contact during landing, the floats are supposed to skim across the water on plane like water skis. As more weight put on the floats, the floatplane is supposed to gradually slow down without capsizing, until settling into displacement, where the entire aircraft weight is supported by the buoyancy of the floats.

If a floatplane's landing gear is in the extended position on initial contact with the water, the wheels tend to dig into the water, and slow the aircraft too quickly. This abrupt deceleration could hurl the aircraft over onto its nose, and the aircraft could literally dive nose first into the water. The abrupt stop could injure the occupants. In addition, an aircraft suddenly turned submarine, or floating inverted on its back in the water with its cabin submerged, poses significant drowning hazard.

Landing gear which retracts into a float is typically protected by gear doors which close after the gear has retracted. In land planes gear doors are installed to reduce drag, and therefore increase aircraft performance, principally speed aloft. In amphibians a more important reason for gear doors exists: to prevent water from entering the wheel well during water landings.

A typical float plane may land at 60 MPH. If the gear doors are open at that speed when the float initially contacts water, the wheel wells will immediately fill with water at high pressure urged into the wells by virtue of the speed of the airplane relative to the water. At high impact speeds water becomes a formidable force. Water landings with open gear doors have been known to result in the hull tearing open due to water pressure, hastening the airplane's sinking and the risk of occupant drowning and injury.

Even where the landing gear is correctly retracted during a water landing, if the gear doors should fail open, a similar result to a gear-down water landing may obtain: hull damage and sinking of the aircraft, with attendant hazard to its occupants. Thus, it would be desirable to provide a gear design incorporating gear doors which are sturdy and resistant to failure in the presence of water pressure during a water landing.

Existing Designs

A number float retractable landing gear designs have been proposed. One design provides main landing gear which retracts rear-wards into the floats aft of the float step. The nose gear extends from the nose of the aircraft. Many light and ultra-light aircraft designs incorporate a high-wing mounted engine driving a pusher propeller, so the nose of such aircraft doesn't contain any structural re-enforcement (which it would if the engine were nose-mounted) onto which to attach the retractable nose gear. This re-enforcement must be added, increasing the aircraft weight and nose gear loading.

Another approach is to provide a pair of opposing gear doors mounted to the bottom of the float forward of the step. The hydrodynamic forces exerted on the float during water landings subjects these gear doors to high stresses, which may contribute to their failure. As noted above, gear door failure during water landings can have dire consequences, indeed.

SUMMARY OF THE INVENTION

Accordingly, it is an object of the present invention to provide a float retractable landing gear whose landing gear doors are urged to remain closed and in place under the influence of hydrodynamic pressure. Design features allowing this object to be accomplished include a float side wall cutout land disposed between a float side wall cutout and a float side wall lip, a side gear door sized to co-extend with a lower portion of the float side wall cutout land, a float bottom wall cutout land disposed between a float bottom wall cutout and a float bottom wall lip, and a bottom gear door sized to co-extend with the float bottom wall cutout land. Advantages associated with the accomplishment of this object include greater gear door strength under hydrodynamic pressure, and less possibility of gear door dislodgment during water take-offs and landings, along with the associated safety benefits.

It is another object of the present invention to provide a float retractable landing gear with selectable actuator means failure mode, either retracted or extended. Design features allowing this object to be accomplished include a strut assembly incorporating an over-center toggle feature, and a spring means attached to the strut assembly. Benefits associated with the accomplishment of this object include user selectability of whether the float retractable landing gear fails into the retracted or extended position. Normally, if an airplane to which the float retractable landing gear is mounted is operated primarily off land runways (e.g. during the winter time when the lakes are frozen), the operator would select that the float retractable landing gear fail into the extended position for land landings in case of actuator means failure. Conversely, if an airplane to which the float retractable landing gear is mounted is operated primarily off water, the operator would select that the float retractable landing gear fail into the retracted position for water landings in case of actuator means failure.

It is still another object of this invention to provide a float retractable landing gear whose wheel acts as a dock bumper when the float retractable landing gear is retracted. Design features enabling the accomplishment of this object include a wheel which extends through a float side wall cutout and a float side wall skin cutout when the float retractable landing gear is retracted. Advantages associated with the realization of this object include the convenient provision of a bumper for docking and beaching operations, along with the reduction in damage risk to the float in which the float retractable landing gear is installed.

It is another object of the present invention to provide a float retractable landing gear which incorporates an over-center toggle down lock feature which must be overcome in order to retract the gear. Design features allowing this object to be accomplished include a strut assembly incorporating an over-center toggle feature, whereby aircraft weight urges the gear into the extended position when an aircraft to which the float retractable landing gear is attached rests on the ground, and a spring means attached to the strut assembly. Benefits associated with the accomplishment of this object include the necessity of overcoming the over-center toggle down lock prior to retracting the gear when an aircraft to which the float retractable landing gear is attached rests on the ground, along with the associated safety benefits and reduced risk of aircraft damage.

It is another object of the present invention to provide a float retractable landing gear which is simple in design. Design features allowing this object to be accomplished include one or more hinges and strut ears attached to a spine, a side gear door and a bottom gear door attached to the spine, a strut assembly pivotally attached to the strut ear(s), and a spring means attached to the strut assembly. Benefits associated with the accomplishment of this object include easier maintenance, increased reliability, and reduced cost.

It is another object of the present invention to provide a float retractable landing gear which incorporates a float side wall skin securely attached to a float side wall. Design features allowing this object to be accomplished include a float side wall cutout land disposed between a float side wall cutout and a float side wall lip, and a float side wall skin sized to co-extend with an upper portion of the float side wall cutout land, the float side wall skin being securely attached to the float side wall cutout land. Benefits associated with the accomplishment of this object include increased float side wall rigidity, and hence increased float strength.

It is yet another object of this invention to provide a float retractable landing gear which is inexpensive to manufacture. Design features allowing this object to be achieved include the use of components made of readily available materials. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Eight sheets of drawings are provided. Sheet one contains FIGS. 1, 2 and 3. Sheet two contains FIGS. 4, 5 and 6 Sheet three contains FIG. 7. Sheet four contains FIGS. 8 and 9. Sheet five contains FIGS. 10 and 11. Sheet six contains FIGS. 12 and 13. Sheet seven contains FIGS. 14 and 15. Sheet eight contains FIG. 16.

DETAILED DESCRIPTION OF THE PREFERRED EMBODIMENT

Figure 1:
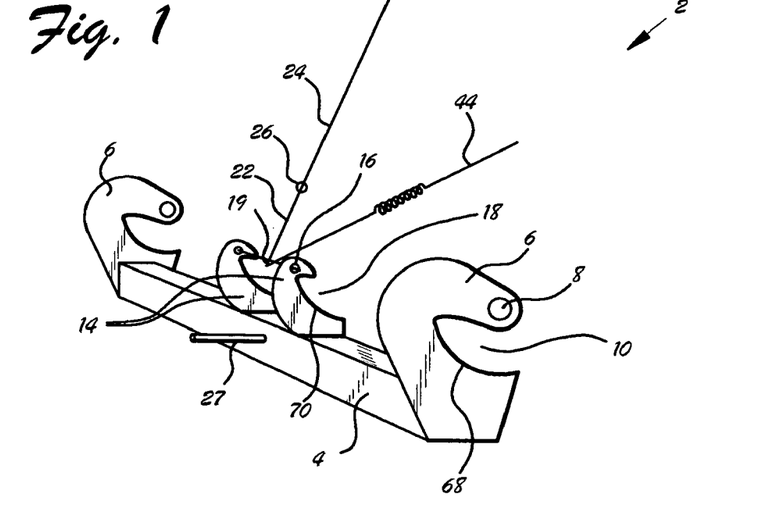
FIGS. 1–3 are side isometric views of most of the components of a float retractable landing gear retracting from the fully extended position of FIG. 1 to the fully retracted position of FIG. 3.
Figure 2:
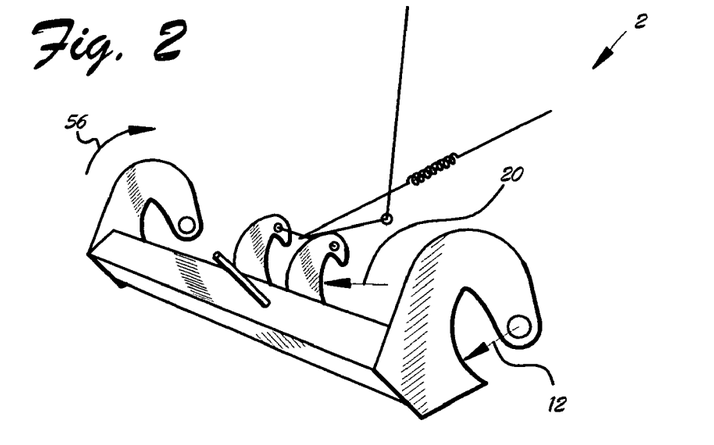
Figure 3:
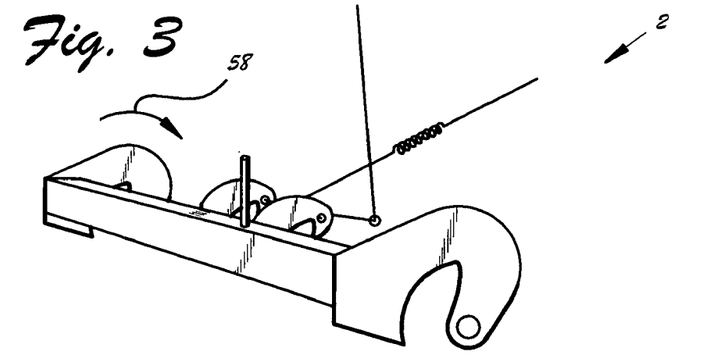

FIGS. 1–3 are side isometric views of most of the components of float retractable landing gear 2 retracting from the fully extended position of FIG. 1 to the fully retracted position of FIG. 3. Float retractable landing gear 2 comprises a hinge 6 attached at either extreme of spine 4. At least one strut ear 14 is attached to spine 4 between hinges 6. Wheel mount 27 is also attached to spine 4, and is sized to accept an appropriately sized wheel.

Each hinge 6 comprises a hinge pivot point 8 at an extreme of hinge 6 opposite spine 4, and a hinge cutout 10 between hinge pivot point 8 and spine 4. Hinge cutout 10 comprises hinge cutout arc 68 of hinge cutout arc radius 12. Hinges 6 rotate relative to float 30 about hinge pivot point 8, as may be observed in FIGS. 4–6.

Each strut ear 14 comprises a strut attach point 16 at an extreme of strut ear 14 opposite spine 4, and a strut ear cutout 18 between strut attach point 16 and spine 4. Strut ear cutout 18 comprises strut ear cutout arc 70 of strut ear cutout arc radius 20. In the preferred embodiment, strut ear cutout arc radius 20 was substantially equal to hinge cutout arc radius 12. As may be observed in FIGS. 4–6, in the preferred embodiment, strut ear cutout arc radius 20 and hinge cutout arc radius 12 exceeded the distance from float attach point 31 to float bottom cutout 40.

Figure 16:
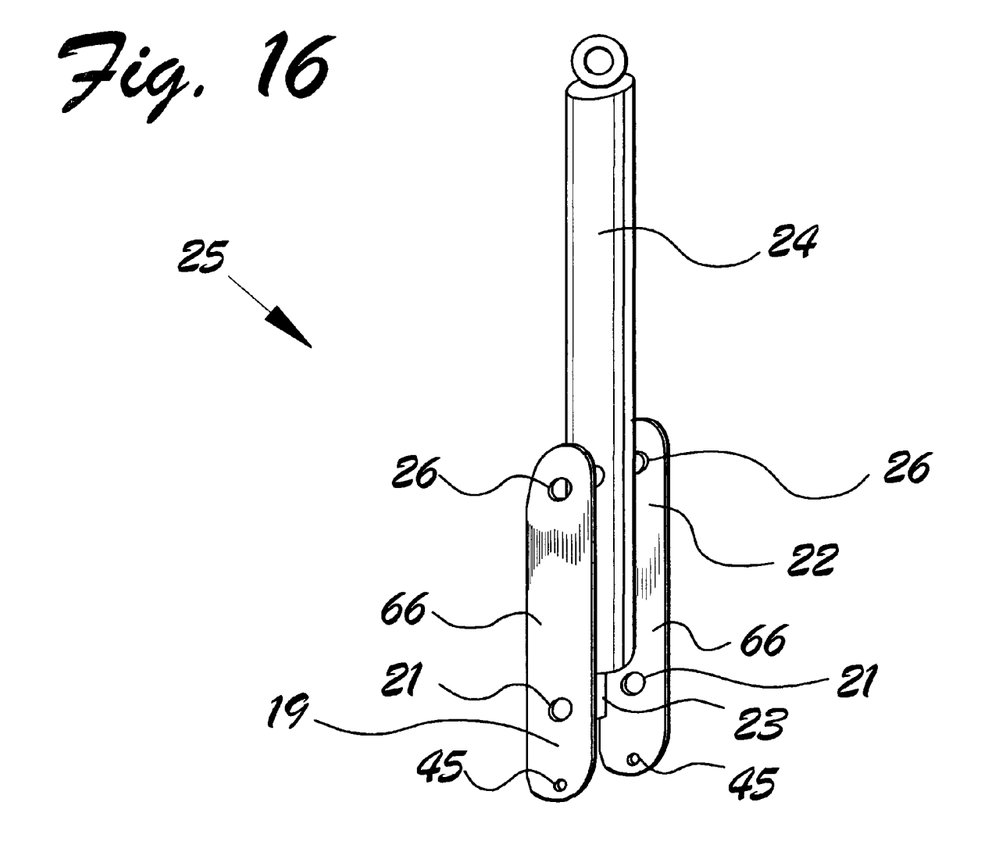
FIG. 16 is a rear quarter isometric view of a preferred embodiment strut assembly.

FIG. 16 depicts the preferred embodiment strut assembly 25. Strut assembly 25 comprises upper strut 24 rotatably attached to lower strut 22 at strut hinge 26. Lower strut 22 comprises at least one ear attach point 21. At least one ear attach point 21 is rotatably attached to a strut attach point 16 on a strut ear 14. As may be observed in the preferred embodiment strut assembly 25 illustrated in FIG. 16, lower strut 22 comprises a pair of lower strut arms 66 rigidly attached at either side of stop 23. Each lower strut arm 66 comprises strut hinge 26 at one extreme, and spring attach point 45 at an opposite extreme. Ear attach point 21 is disposed between strut hinge 26 and spring attach point 45. That portion of lower strut 22 which extends from ear attach point 21 to spring attach point 45 is lower strut lever 19. Although the preferred embodiment strut assembly 25 illustrated in FIG. 16 depicts a pair of lower strut arms 66 rigidly attached at either side of stop 23, it is intended to be within the scope of this disclosure that lower strut 22 comprise a single lower strut arm 66, with a stop 23 attached.

Referring now also to FIGS. 8–11, lower strut 22 comprises strut hinge 26 at one extreme, and spring attach point 45 at an opposite extreme. Ear attach point 21 is disposed between strut hinge 26 and spring attach point 45. That portion of lower strut 22 which extends from ear attach point 21 to spring attach point 45 is lower strut lever 19. Lower strut 22 further comprises stop 23 disposed on one side. Stop 23 limits rotation of upper strut 24 relative to lower strut 22 when upper strut lever 15 butts up against stop 23.

Upper strut 24 comprises upper strut lever 15 disposed at one extreme, and strut hinge 26 adjacent upper strut lever 15. Upper strut 24 is rotatably attached to lower strut 22 at strut hinge 26. In the preferred embodiment, strut hinge 26 was a bolt or other fastener extending through both upper strut 24 and lower strut 22. Rotation of upper strut 24 relative to lower strut 22 is limited when upper strut lever 15 butts up against stop 23.

Figure 8:
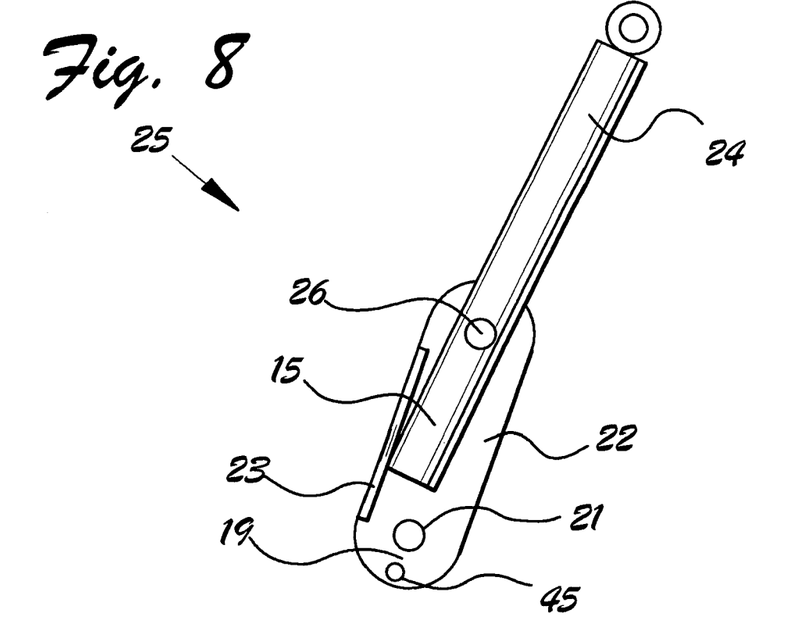
FIGS. 8–11 are front isometric cross-sectional views of a strut assembly transiting from the fully extended, over-center toggle position of FIG. 8, through the top center position of FIG. 9, to the fully retracted position of FIG. 11.

Thus, strut assembly 25 incorporates an over center toggle feature which locks float retractable landing gear 2 into an extended position when an aircraft to which float retractable landing gear 2 is attached rests on the ground. FIG. 8 depicts this configuration: in order for float retractable landing gear 2 to retract, upper strut 24 would have to rotate through the top center position relative to lower strut 22 depicted in FIG. 9, against the weight of the aircraft. A spring means 44 attached to lower strut 22 at spring attach point 45 also holds strut assembly 25 in the over center extended position shown in FIG. 8, regardless of whether the aircraft rests on the ground or not. During extension, an actuator means pulls strut assembly 25 through the top center configuration depicted in FIG. 9, thus breaking the over center toggle down lock. Spring means 44 may be any appropriate spring means, including but not limited to a coil spring, air spring, elastic bungee spring, or any other appropriate spring means.

Figure 4:
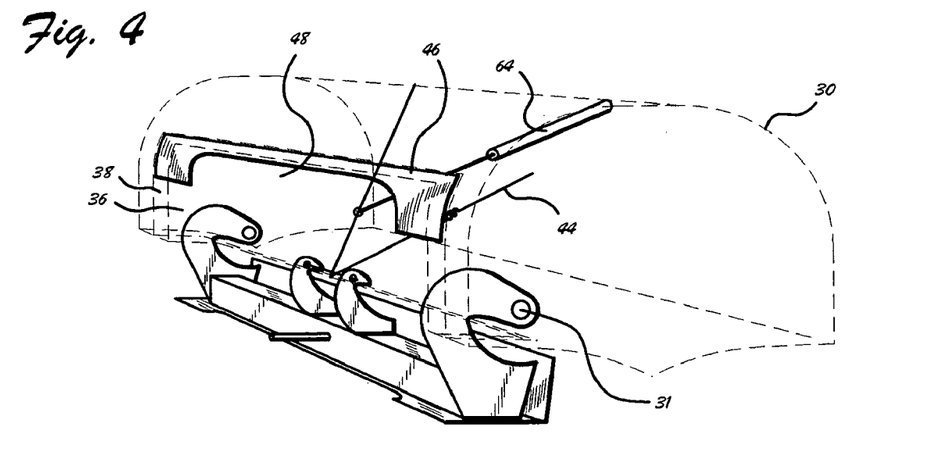
FIGS. 4–6 are side isometric views of a float retractable landing gear retracting from the fully extended position of FIG. 4 to the fully retracted position of FIG. 6, with the float depicted in dashed lines.

FIGS. 1 and 4 depict float retractable landing gear 2 in the fully extended position. Strut assembly 25 is in the over center position depicted in FIG. 8, and held in that position by spring means 44. Thus, in the position depicted in FIGS. 1, 4 and 8, float retractable landing gear 2 is locked in the extended position by spring means 44 holding strut assembly 25 in the over center position. In addition, if on the ground, the weight of the aircraft onto which float retractable landing gear 2 is installed will hold float retractable landing gear in the extended position: the heavier the aircraft, the more securely float retractable landing gear 2 is locked down, because in order to retract, strut assembly 25 would have to pass through the top center position depicted in FIG. 9, against the weight of the airplane.

Figure 5:
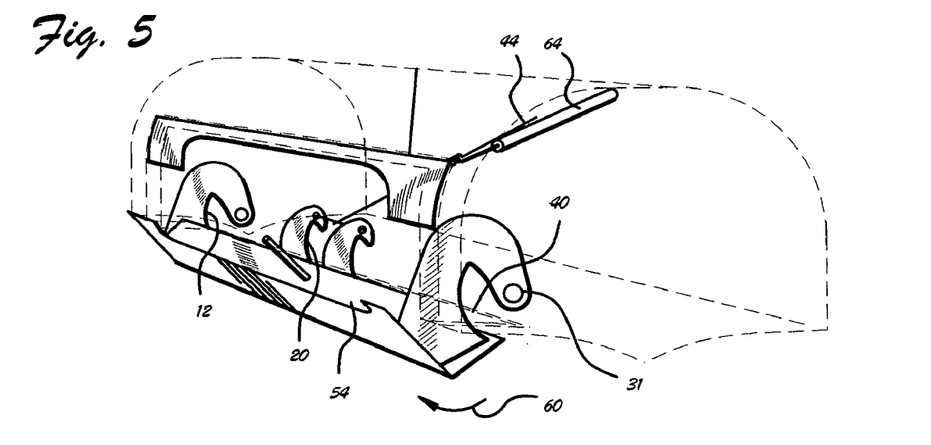
Figure 9:
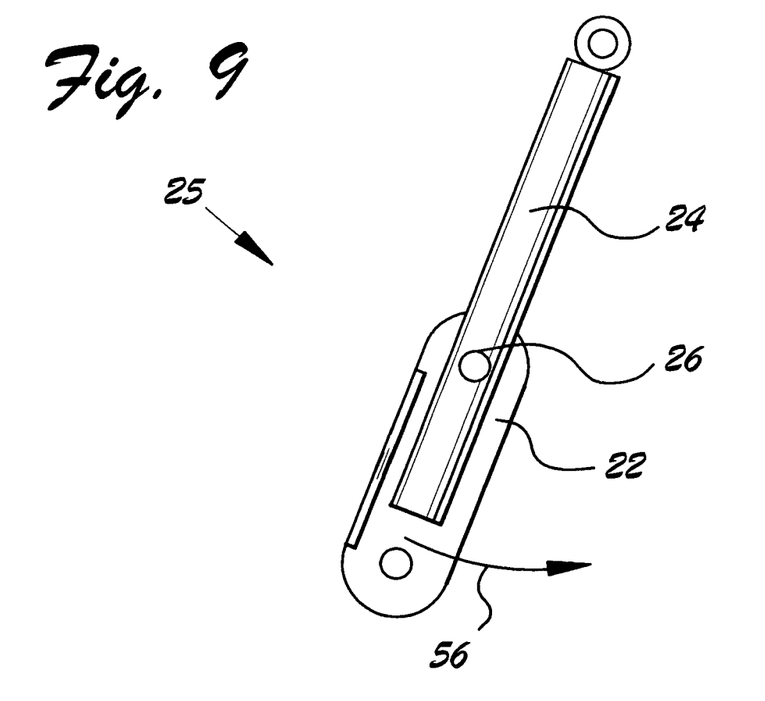

FIGS. 2 and 5 depicts float retractable landing gear 2 in mid-retraction, as indicated by arrows 56 and 60 in FIGS. 2, 9 and 5 respectively. Strut assembly 25 has passed the top center position depicted in FIG. 9, and is passing the strut assembly 25 position depicted in FIG. 10.

Figure 6:
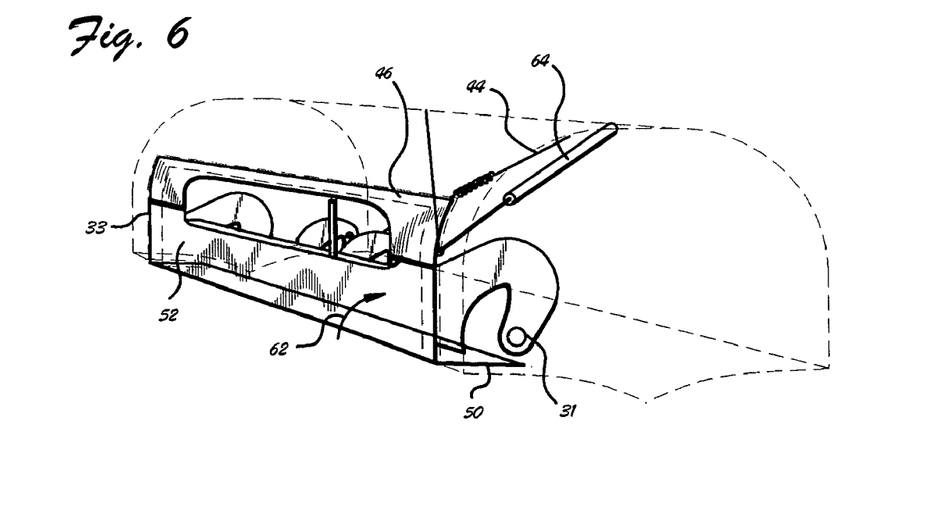
Figure 11:
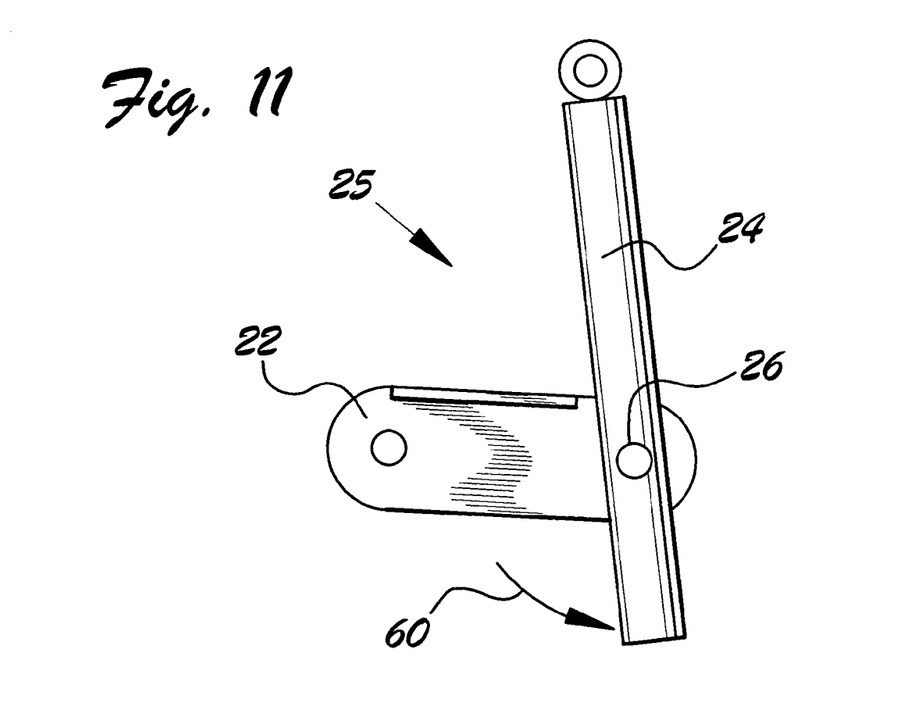

FIGS. 3 and 6 show float retractable landing gear 2 in the fully retracted position, having rotated relative to float 30 as indicated by arrows 58, 60 and 62 in FIGS. 3, 11 and 6 respectively. Strut assembly 25 is in the retracted position depicted in FIG. 11.

In one embodiment, the spring constant of spring means 44 is sufficiently high to hold float retractable landing gear 2 in the retracted position against gravity if the actuator means 64 fails. This embodiment would be appropriate if an airplane to which float retractable landing gear 2 is mounted is operated primarily off water. In such circumstances the operator would select that a high enough spring constant for spring means 44 to keep float retractable landing gear 2 retracted against gravity, so that float retractable landing gear 2 will fail into the retracted position for water landings in case of actuator means 64 failure.

In an alternate embodiment, the spring constant of spring means 44 is low enough to allow gravity to draw float retractable landing gear 2 into the extended position against spring means 44 if the actuator means 64 fails. This embodiment would be appropriate if an airplane to which float retractable landing gear 2 is mounted is operated primarily off land runways (e.g. during the winter time when the lakes are frozen). In such circumstances the operator would select a spring constant low enough so that float retractable landing gear 2 will fail into the extended position for land landings in case of actuator means failure.

FIGS. 4–6 are side isometric views of float retractable landing gear 2 retracting from the fully extended position of FIG. 4 to the fully retracted position of FIG. 6.

Each hinge pivot point 8 is rotatably attached to float 30 at float attach point 31. Typically, float attach point 31 may be disposed on a float bulkhead. Thus, when retracting, hinges 6 rotate about float attach point 31, which is co-located with hinge pivot point 8, as indicated by arrows 60 and 62 in FIGS. 5 and 6.

FIG. 4 depicts float retractable landing gear 2 in the extended position. Strut assembly 25 is in the over center position depicted in FIG. 8, and held in that position by spring means 44, as described above. Actuator means 64 is attached to strut assembly 25, and is shown fully extended in FIG. 4. Actuator means 64 may be hydraulic, pneumatic, electrical, mechanical (including a cable and pulley system), or any other appropriate actuator means.

At the beginning of the retraction cycle, actuator means 64 begins to retract, pulling strut assembly 25 through the top center position depicted in FIG. 9, thus breaking the over-center toggle down-lock of float retractable landing gear 2. Actuator means 64 continues retracting, causing the angle between upper strut 24 and lower strut 22 to decrease.

FIG. 9 depicts strut assembly 25 passing over top center. If strut assembly 25 is on the extended side of top center, the weight of float 30, float retractable landing gear 2, and any aircraft attached to same tends to maintain float retractable landing gear 2 in the extended position. Conversely, if the strut assembly is on the retracted side of top center, the weight of float 30, float retractable landing gear 2, and any aircraft attached to same tends to push float retractable landing gear 2 into the retracted position, until float retractable landing gear 2 is approximately midway through its retraction cycle.

FIG. 5 depicts float retractable landing gear 2 approximately midway through its retraction cycle. Throughout the retraction cycle hinge cutout 10 and strut ear cutout 18 avoid mechanical interference with float bottom cutout 40 by virtue of hinge cutout arc radius 12 and strut ear cutout arc radius 20 respectively. As may be observed, hinge cutout arc radius 12 and strut ear cutout arc radius 20 must be greater than the distance between float attach point 31 and float bottom cutout 40.

FIG. 6 depicts float retractable landing gear 2 fully retracted, having rotated as indicated by arrows 60 and 62 in FIGS. 5 and 6 respectively. Side gear door 52 is now firmly supported by the lower portion of float side cutout lands 38, and constrained against lateral movement by float side wall lip 33. Bottom gear door 50 is now firmly supported by float bottom cutout land 42, and constrained against lateral movement by float bottom lip 35.

Figure 10:
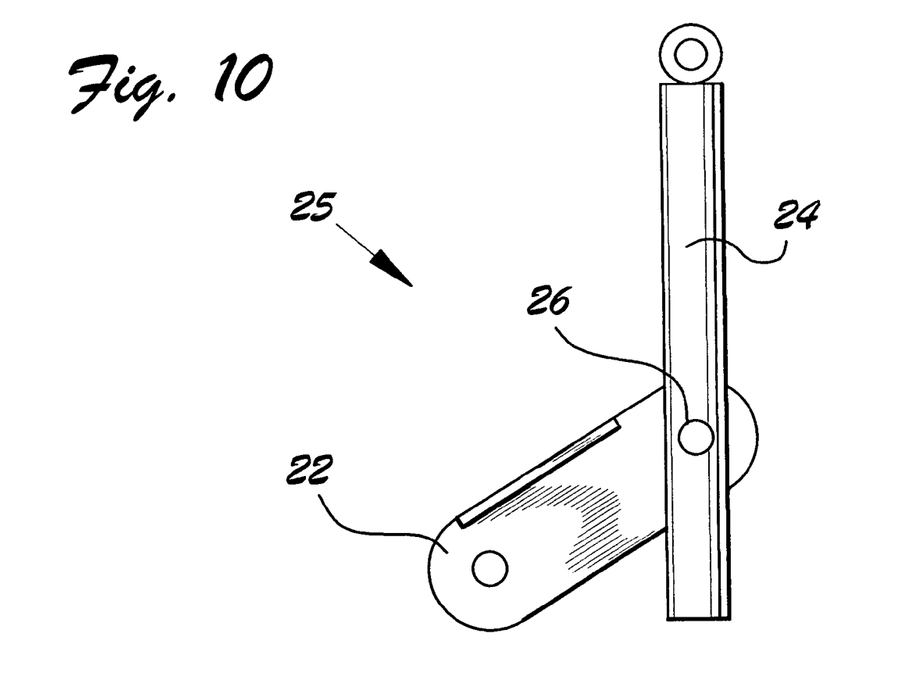

FIGS. 10 and 11 depict strut assembly 25 as float retractable landing gear 2 completes its retraction cycle after strut assembly 25 passes top center. FIG. 10 depicts the configuration of strut assembly 25 corresponding to the position of float retractable landing gear 2 shown in FIGS. 2 and 5; FIG. 11 depicts the configuration of strut assembly 25 corresponding to the position of float retractable landing gear 2 shown in FIGS. 3 and 6.

Float retractable landing gear 2 further comprises float side wall skin 46 attached over the upper portion of float side wall cutout 36. Float side wall skin 46 comprises float side wall skin cutout 48. Side gear door 52 comprises side gear door cutout 54. Float side wall skin cutout 48 and side gear door cutout 54 communicate and cooperate with each other when float retractable landing gear is in the retracted position, to permit part of wheel 28 to extend through float side wall skin cutout 48 and side gear door cutout 54.

Figure 7:
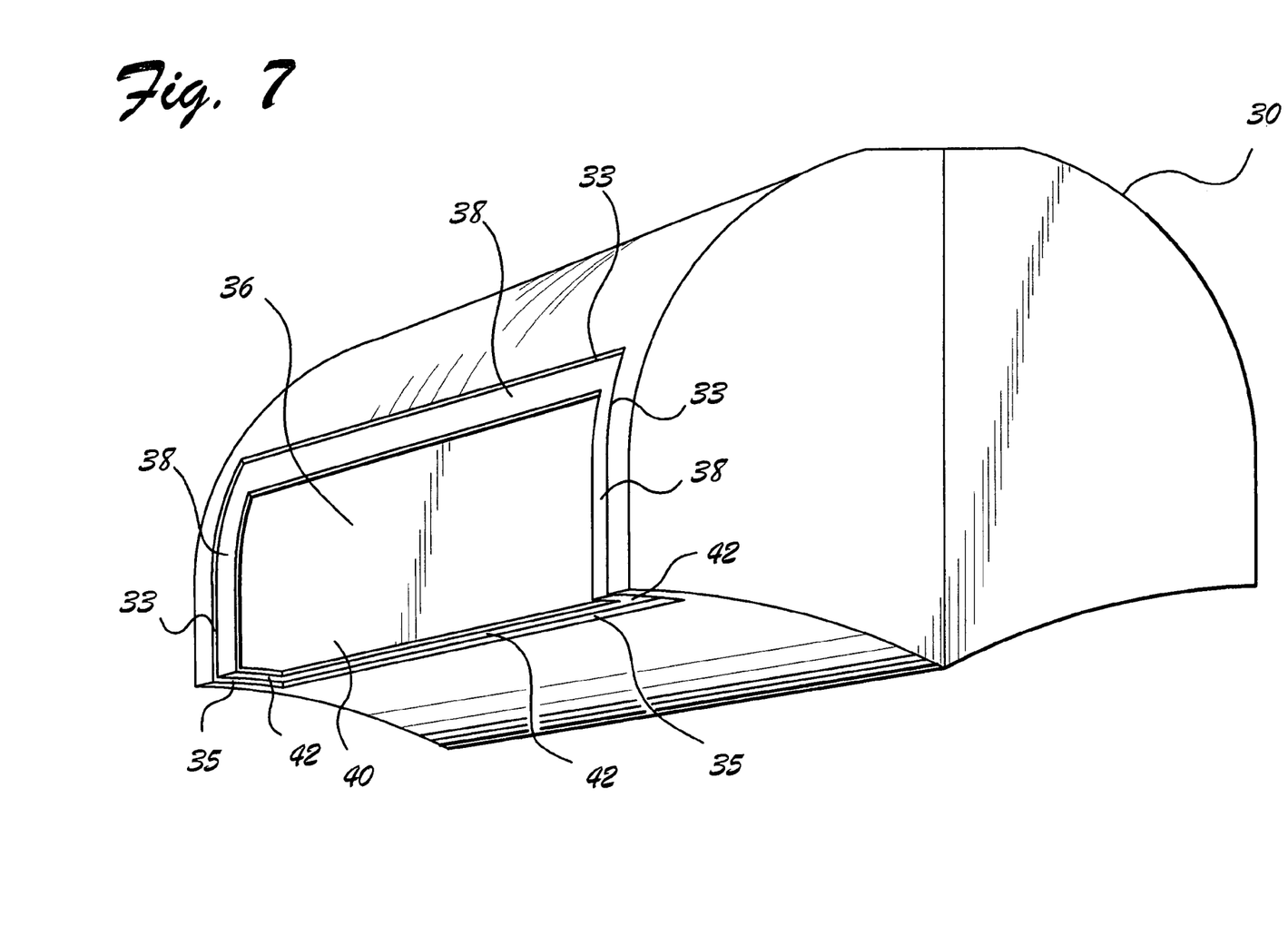
FIG. 7 is a bottom isometric view of a float section with float side wall cutout and float bottom cutout.

Referring now also to FIG. 7, a bottom isometric view of a float 30 section with float side wall cutout 36 and float bottom cutout 40, the outer edges of float side wall skin 46 are sized to co-extend with the outer edges of the upper portion of float side wall cutout land 38. Float side wall skin 46 is also sized to fit within float side wall lips 33.

Float side wall cutout lands 38 are disposed between float side wall lip 33 and float side wall cutout 36. Float bottom cutout land 42 is disposed between float bottom lips 35 and float bottom cutout 40.

In the preferred embodiment float side wall skin 46 was removably attached to float 30 with screws or other appropriate fasteners. The inclusion of float side wall skin 46 in the instant design improves float 30 strength and stiffness. In addition, the removability of float side wall skin 46 facilitates servicing and repairs of float side wall skin 46.

Thus, when float retractable landing gear 2 is in the retracted position depicted in FIG. 6, hydrodynamic pressure against float side wall skin 46 tends to press float side wall skin 46 firmly against float side wall cutout land 38, which in turn supports it firmly against water pressure, and any lateral or up/down movement of float side wall skin 46 is mechanically limited by float side wall lips 33 at its upper and side edges, and by the upper edge of side gear door 52 at its lower edge.

Similarly, the outer lateral edges of side gear door 52 are sized to co-extend with the lower portion of float side wall cutout lands 38, and the edges of bottom gear door 50 are sized to co-extend with float bottom cutout lands 42. Side gear door 52 is sized to fit between the lower portion of opposing float side wall lips 33, and bottom gear door 50 is sized to fit within float bottom lips 35.

Thus, when float retractable landing gear 2 is in the retracted position depicted in FIG. 6, hydrodynamic pressure against side gear door 52 tends to press it firmly against the lower portions of opposing float side wall cutout lands 38, which in turn support it firmly against water pressure, and any lateral or up/down movement of side gear door 52 is mechanically limited by float side wall lips 33 at its side edges, and by the lower edge of float side wall skin 46 at its upper edge.

Similarly, when float retractable landing gear 2 is in the retracted position depicted in FIG. 6, hydrodynamic pressure against bottom gear door 50 tends to press it firmly against float bottom cutout lands 42, which in turn support it firmly against water pressure, and any lateral movement of bottom gear door 50 is mechanically limited by float bottom lips 35.

In the preferred embodiment, the thickness of float side wall skin 46 and of side gear door 52 was substantially equal to a depth of float side wall lip 33. Similarly, the thickness of bottom gear door 50 was substantially equal to a depth of float bottom lip 35.

Figure 12:
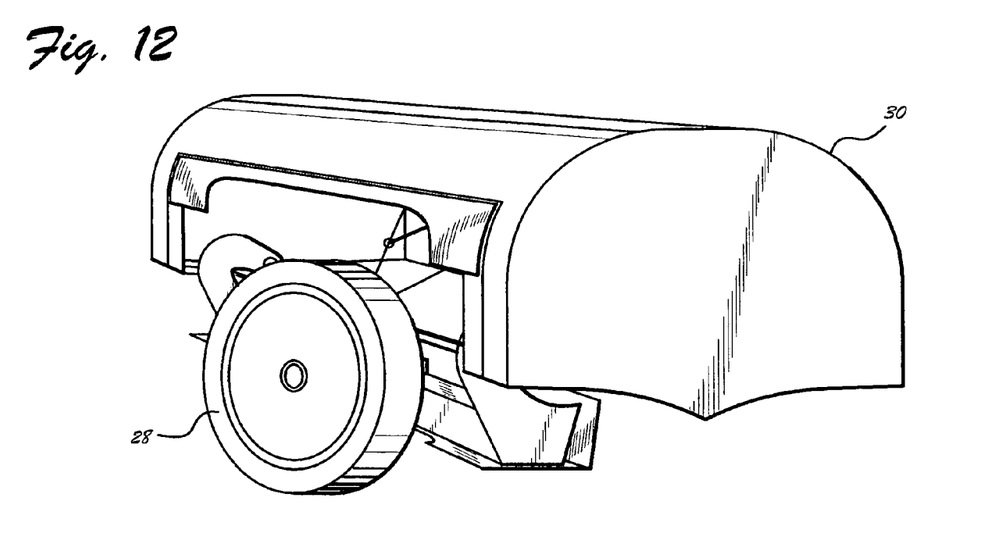
FIG. 12 is a side isometric view of a float retractable landing gear with wheel in the extended position.

FIG. 12 is a side isometric view of a float retractable landing gear 2 with a wheel attached, in the extended position.

Figure 13:
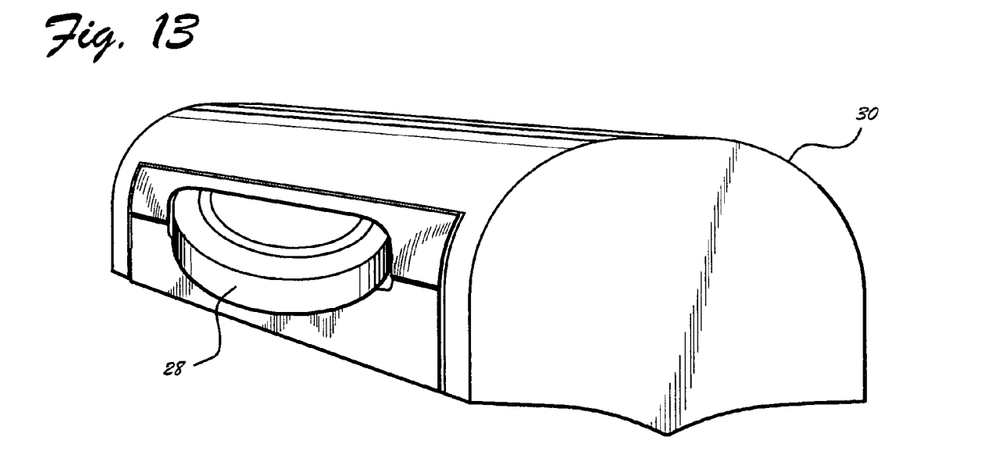
FIG. 13 is a side isometric view of a float retractable landing gear with wheel in the retracted position.

FIG. 13 is a side isometric view of a float retractable landing gear with a wheel 28 attached, in the retracted position. Float side wall skin cutout 48 and side gear door cutout 54 cooperate to provide an opening for wheel 28 to extend laterally from float 30. That portion of wheel 28 which extends laterally from float 30 serves as a useful bumper to protect float 30 from docks, waterway sides, etc.

Figure 14:
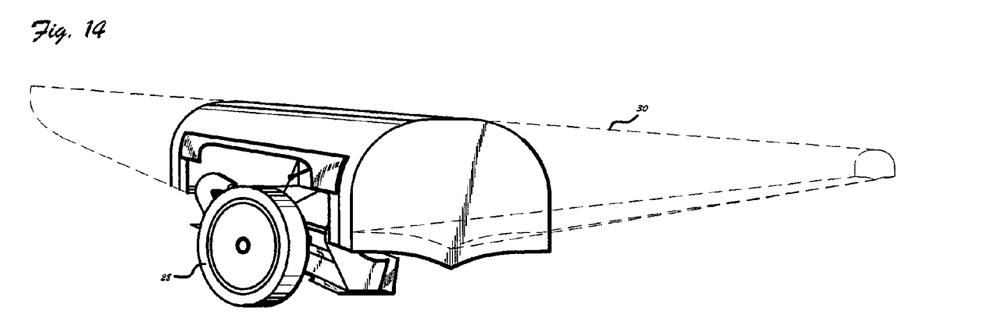
FIG. 14 is a side isometric view of an entire full float with a float retractable landing gear in the extended position.

FIG. 14 is a side isometric view of an entire float 30 with a float retractable landing gear 2 in the extended position. As may be observed from this view, float retractable landing gear 2 may be installed forward of the float step.

Figure 15:
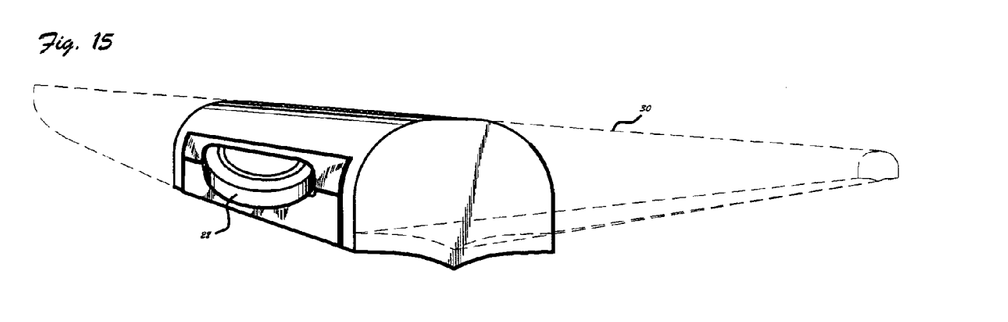
FIG. 15 is a side isometric view of an entire full float with a float retractable landing gear in the retracted position.

FIG. 15 is a side isometric view of an entire float 20 with a float retractable landing gear 2 in the retracted position. As may be observed from this view, the portion of wheel 28 which extends laterally from float 30 through float side wall skin cutout 48 and side gear door cutout 54 serves as a useful bumper to protect float 30.

In the preferred embodiment, float retractable landing gear 2 was made of metal, synthetic, composite, wood, or other appropriate material.

While a preferred embodiment of the invention has been illustrated herein, it is to be understood that changes and variations may be made by those skilled in the art without departing from the spirit of the appending claims.

| DRAWING ITEM INDEX | |
|---|---|
| 2 | retractable floatplane landing gear |
| 4 | spine |
| 6 | hinge |
| 8 | hinge pivot point |
| 10 | hinge cutout |
| 12 | hinge cutout arc radius |
| 15 | upper strut lever |
| 14 | strut ear |
| 16 | strut attach point |
| 18 | strut ear cutout |
| 19 | lower strut lever |
| 20 | strut ear cutout arc radius |
| 21 | ear attach point |
| 22 | lower strut |
| 23 | stop |
| 24 | upper strut |
| 25 | strut assembly |
| 26 | strut hinge |
| 27 | wheel mount |
| 28 | wheel |
| 30 | float |
| 31 | float attach point |
| 33 | float side wall lip |
| 35 | float bottom lip |
| 36 | float side wall cutout |
| 38 | float side wall cutout land |
| 40 | float bottom cutout |
| 42 | float bottom cutout land |
| 44 | spring means |
| 45 | spring attach point |
| 46 | float side wall skin |
| 48 | float side wall skin cutout |
| 50 | bottom gear door |
| 52 | side gear door |
| 54 | side gear door cutout |
| 56 | arrow |
| 58 | arrow |
| 60 | arrow |
| 62 | arrow |
| 64 | actuator means |
| 66 | lower strut arm |
| 68 | hinge cutout arc |
| 70 | strut ear cutout arc |

I claim:

1. A float retractable landing gear comprising a spine, at least one hinge attached to said spine, at least one strut ear attached to said spine, a wheel mount attached to said spine, and a strut assembly comprising an upper strut rotatable attached to a lower strut at a strut hinge, said lower strut being rotatably attached to at least one said strut ear at an ear attach point, each said at least one hinge comprising a hinge pivot point at an extreme of said at least one hinge opposite said spine.

2. The float retractable landing gear of claim 1 wherein each said strut ear comprises a strut attach point at an extreme of said strut ear opposite said spine, said ear attach point being rotatably attached to at least one said strut ear at said strut attach point.

3. The float retractable landing gear of claim 2 wherein each said at least one hinge comprises a hinge cutout between said spine and said hinge pivot point.

4. The float retractable landing gear of claim of claim 3 wherein each said strut ear comprises a strut ear cutout between said spine and said strut attach point.

5. The float retractable landing gear of claim 4 wherein said hinge cutout comprises a hinge cutout arc having a hinge cutout arc radius, and said strut ear cutout comprises a strut ear cutout arc having a strut ear cutout arc radius.

6. The float retractable landing gear of claim 5 wherein said hinge cutout arc radius and said strut ear cutout arc radius are substantially equal.

7. The float retractable landing gear of claim of claim 6 wherein said hinge pivot point is rotatably attached to a float at a float attach point, said float comprising a float bottom cutout, said hinge cutout arc radius and said strut ear cutout arc radius exceeding a distance from said float attach point to said float bottom cutout.

8. The float retractable landing gear of claim 2 wherein said strut hinge is disposed at one extreme of said lower strut a spring attach point is disposed at an opposite extreme of said lower strut, and said ear attach point is disposed between said strut hinge and said spring attach point, a distance from said ear attach point to said spring attach point being a strut lever.

9. The float retractable landing gear of claim 8 wherein said lower strut further comprises a stop, and said upper strut comprises an upper strut lever disposed at one extreme of said upper strut, said strut hinge being disposed adjacent said upper strut lever, rotation of said upper strut relative to said lower strut being limited by end of travel interference between said upper strut lever and said stop.

10. The float retractable landing gear of claim 9 wherein said lower strut comprises a lower strut arm attached at either side of said stop, each said lower strut arm comprising one said strut hinge at one extreme, a spring attach point at an opposite extreme, and one said ear attach points between said strut hinge and said spring attach point, at least one said strut attach point being rotatably attached to the said ear attach points.

11. The float retractable landing gear of claim 2 further comprising a spring means attached to said spring attach point.

12. The float retractable landing gear of claim 2 further comprising a side gear door and a bottom gear door attached to said spine.

13. In combination, the float retractable landing gear of claim 2 and a float, said float comprising a float side wall cutout communicating with a float bottom cutout, said float retractable landing gear further comprising a float side wall skin disposed over an upper portion of said float side wall cutout, said side gear door being sized to cover a lower portion of said float side wall cutout, said bottom gear door being sized to cover said float bottom cutout.

14. The float retractable landing gear and float of claim 13 wherein said float further comprises float side wall cutout lands surrounding said float side wall cutout, and a float side wall lip disposed around said float side wall cutout lands, said float side wall skin edges being sized to co-extend with an upper portion of said float side wall cutout lands, said float side wall skin being sized to fit within an upper portion of said float side wall lips.

15. The float retractable landing gear and float of claim 14 wherein said side gear door edges are sized to co-extend with a bottom portion of said float side wall cutout lands, and sized to fit between a lower portion of opposed said float side wall lips.

16. The float retractable landing gear and float of claim 15 wherein said float further comprises float bottom cutout lands surrounding said float bottom cutout, and a float bottom lip disposed around said float bottom cutout lands, edges of said bottom gear door being sized to co-extend with said float bottom cutout lands, said bottom gear door being sized to fit within said float bottom lip.

17. The float retractable landing gear of claim 16 wherein a thickness of said float side wall skin and of said side gear door is substantially equal to a depth of said float side wall lip.

18. The float retractable landing gear of claim 17 wherein a thickness of said bottom gear door is substantially equal to a depth of said float bottom lip.

19. The float retractable landing gear of claim 11 wherein a spring constant of said spring means is sufficiently low so as to allow gravity to draw said float retractable landing gear into an extended position against a force exerted by said spring means.

20. The float retractable landing gear of claim 11 wherein a spring constant of said spring means is sufficiently high enough so as to hold said float retractable landing gear in a retracted position against gravity.

21. The float retractable landing gear and float of claim 13 wherein said float side wall skin comprises a float side wall skin cutout sized to admit part of a wheel, and said side gear door comprises a side gear door cutout sized to admit part of said wheel, said float side wall skin cutout communicating with said side gear door cutout when said float retractable landing gear is retracted, said float side wall skin cutout cooperating with said side gear door cutout to permit a portion of said wheel to extend laterally from said float when said float retractable landing gear is retracted, whereby said wheel acts as a bumper to protect said float.

22. The float retractable landing gear of claim 1 wherein said strut assembly comprises an over center toggle down lock feature.

23. The float retractable landing gear of claim 22 wherein said over center toggle down lock feature comprises a spring means attached to an extreme of said lower strut opposite said strut hinge, a stop rigidly attached to said lower strut, and said upper strut comprises an upper strut lever, angular rotation of said upper strut relative to said lower strut being limited by mechanical interference between said upper strut lever and said stop.

24. A float retractable landing gear comprising a spine, a hinge attached at each extreme of said spine, a pair of strut ears attached to said spine between said hinges, a wheel mount attached to said spine, and a strut assembly comprising an upper strut rotatably attached to a lower strut at a strut hinge, said lower strut being rotatably attached to said strut ears at an car attach point.

25. The float retractable landing gear of claim 24 wherein said strut assembly comprises an over center toggle down lock feature.

26. The float retractable landing gear of claim 25 wherein said over center toggle down lock feature comprises a spring means attached to a spring attach point disposed at an extreme of said lower strut opposite said strut hinge, a stop rigidly attached to said lower strut, a distance between said ear attach point and said spring attach point defining a lower strut lever, and said upper strut comprises an upper strut lever, angular rotation of said upper strut relative to said lower strut being limited by mechanical interference between said upper strut lever and said stop.

27. The float retractable landing gear of claim 26 wherein a spring constant of said spring means is sufficiently low so as to allow gravity to draw said float retractable landing gear into an extended position against a force exerted by said spring means.

28. The float retractable landing gear of claim 26 wherein a spring constant of said spring means is sufficiently high enough so as to hold said float retractable landing gear in a retracted position against gravity.

29. The float retractable landing gear of claim 26 further comprising a side gear door and a bottom gear door attached to said spine.

30. In combination, the float retractable landing gear of claim 29 and a float, said float comprising a float side wall cutout communicating with a float bottom cutout, said float retractable landing gear further comprising a float side wall skin disposed over an upper portion of said float side wall cutout, said side gear door being sized to cover a lower portion of said float side wall cutout, said bottom gear door being sized to cover said float bottom cutout.

31. The float retractable landing gear and float of claim 30 wherein said float side wall skin comprises a float side wall skin cutout sized to admit part of a wheel, and said side gear door comprises a side gear door cutout sized to admit part of said wheel, said float side wall skin cutout communicating with said side gear door cutout when said float retractable landing gear is retracted, said float side wall skin cutout cooperating with said side gear door cutout to permit a portion of said wheel to extend laterally from said float when said float retractable landing gear is retracted, whereby said wheel acts as a bumper to protect said float.

32. The float retractable landing gear and float of claim 31 wherein said float her comprises float side wall cutout lands surrounding said float side wall cutout, and a float side wall lip disposed around said float side wall cutout lands, said float side wall skin edges being sized to co-extend with an upper portion of said float side wall cutout lands, said float side wall skin being sized to fit within on upper portion of said float side wall lips.

33. The float retractable landing gear and float of claim 32 wherein said side gear door edges are sized to co-extend with a bottom portion of said float side wall cutout lands, and sized to fit between a lower portion of opposed said float side wall lips.

34. The float retractable landing gear and float of claim 33 wherein said float further comprises float bottom cutout lands surrounding said float bottom cutout, and a float bottom lip disposed around said float bottom cutout lands, edges of said bottom gear door being sized to co-extend with said float bottom cutout lands, said bottom gear door being sized to fit within said float bottom lip.

35. The float retractable landing gear of claim 34 wherein a thickness of said float side wall skin and of said side gear door is substantially equal to a depth of said float side wall lip, and wherein a thickness of said bottom gear door is substantially equal to a depth of said float bottom lip.

36. The float retractable landing gear of claim 24 wherein each said hinge attached to an extreme of said spine comprises a hinge cutout arc having a hinge cutout arc radius and each said strut ear comprises a strut ear cutout arc having a strut ear cutout arc radius, said float retractable landing gear being rotatably attached to a float at a float attach point, said float comprising a float bottom cutout, said hinge cutout arc radius and said strut ear cutout arc radius exceeding a distance from said float attach point to said float bottom cutout.

37. The float retractable landing gear of claim 26 wherein said lower strut comprises a pair of lower strut arms rigidly attached at either side of said stop, each said lower strut arm comprising one said strut hinge at one extreme, one said spring attach point at an opposite extreme, an ear attach point disposed between said strut hinge and said spring attach point, and a lower strut lever between said ear attach point and said spring attach point.

* * * * *